United States Patent [19]

Brown et al.

[11] 4,273,224

[45] Jun. 16, 1981

[54] VEHICLE CONTROL SYSTEM WITH CONDITIONAL TRANSMISSION-BRAKE INTERLOCK

[75] Inventors: Vaikai K. Brown, LeRoy Township, Lake County; Thorolf R. Bjorksten, Mentor; Llewellyn L. Walter, Perry, all of Ohio

[73] Assignee: Towmotor Corporation, Mentor, Ohio

[21] Appl. No.: 950,338

[22] Filed: Oct. 11, 1978

[51] Int. Cl.³ .............................................. B60K 41/26
[52] U.S. Cl. .................................................... 192/4 A
[58] Field of Search ..................... 192/4 A, 4 C, 13 R, 192/0.09, 0.044, 0.055, 0.072, 0.073

[56] References Cited

U.S. PATENT DOCUMENTS

| | | | |
|---|---|---|---|
| 2,968,967 | 1/1961 | Ross | 74/472 |
| 3,273,679 | 9/1966 | Uher | 192/0.055 X |
| 3,480,120 | 11/1969 | Lenzen et al. | 192/4 C |
| 3,729,074 | 4/1973 | Anderson et al. | 192/4 C |
| 3,780,839 | 12/1973 | Schroeder | 192/4 A |
| 3,957,143 | 5/1976 | Barth | 192/4 A |
| 4,063,624 | 12/1977 | Beck et al. | 192/4 A |
| 4,105,101 | 8/1978 | Förster et al. | 192/4 A |

Primary Examiner—Rodney H. Bonck
Attorney, Agent, or Firm—Phillips, Moore, Weissenberger, Lempio & Majestic

[57] ABSTRACT

In a vehicle (12, 12a) having interlock means (39, 39a) for maintaining the vehicle transmission (16, 16a) in neutral if powered travel is attempted while the parking brake (29, 29a) is engaged, interlock control means (51, 51a) are provided for inactivating the interlock once the vehicle is undergoing powered travel. If it becomes necessary to use the parking brake to stop motion of the vehicle, the retarding action of the engine (13, 13a) is effective, through the still engaged transmission, to supplement such emergency use of the parking brake.

9 Claims, 2 Drawing Figures

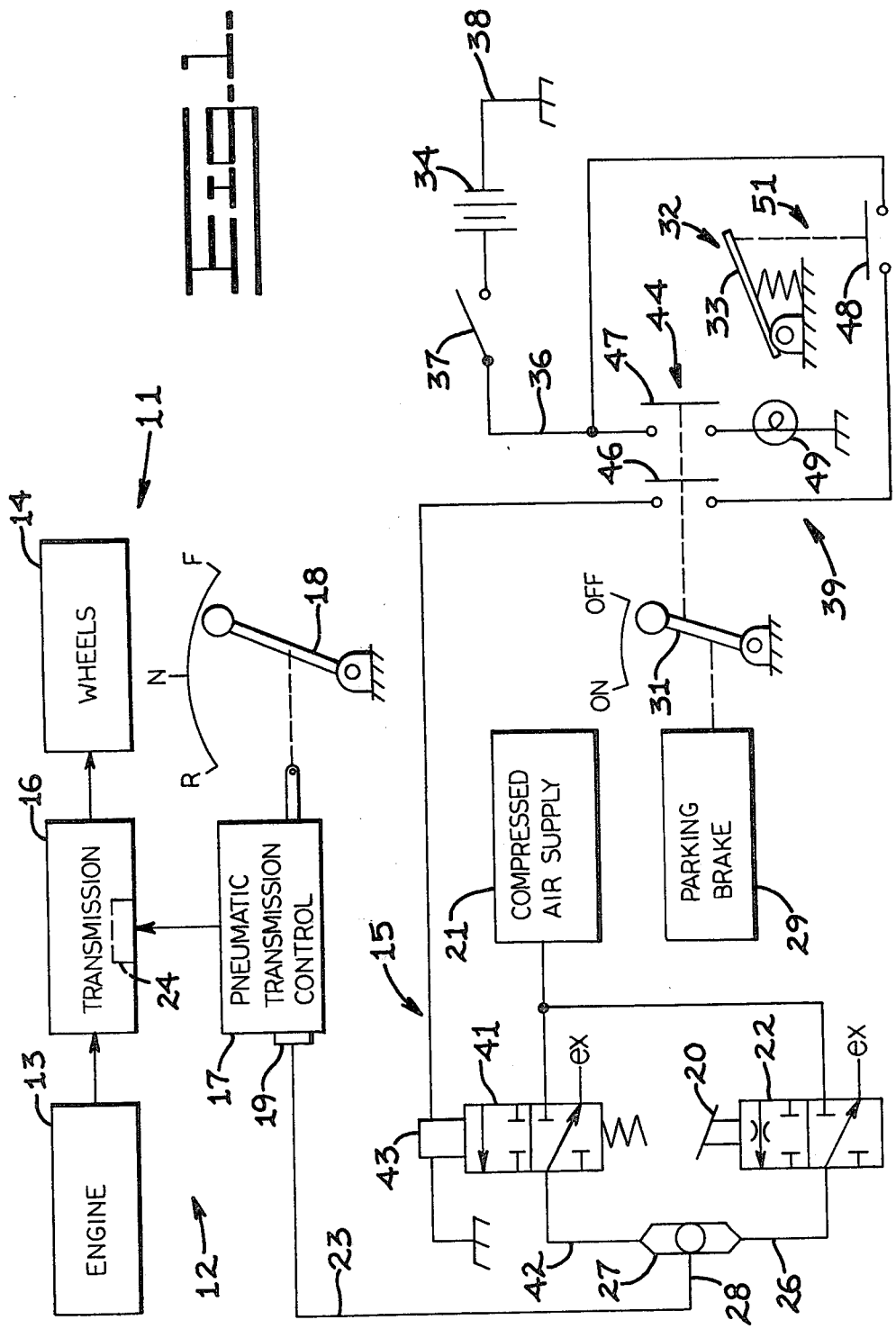

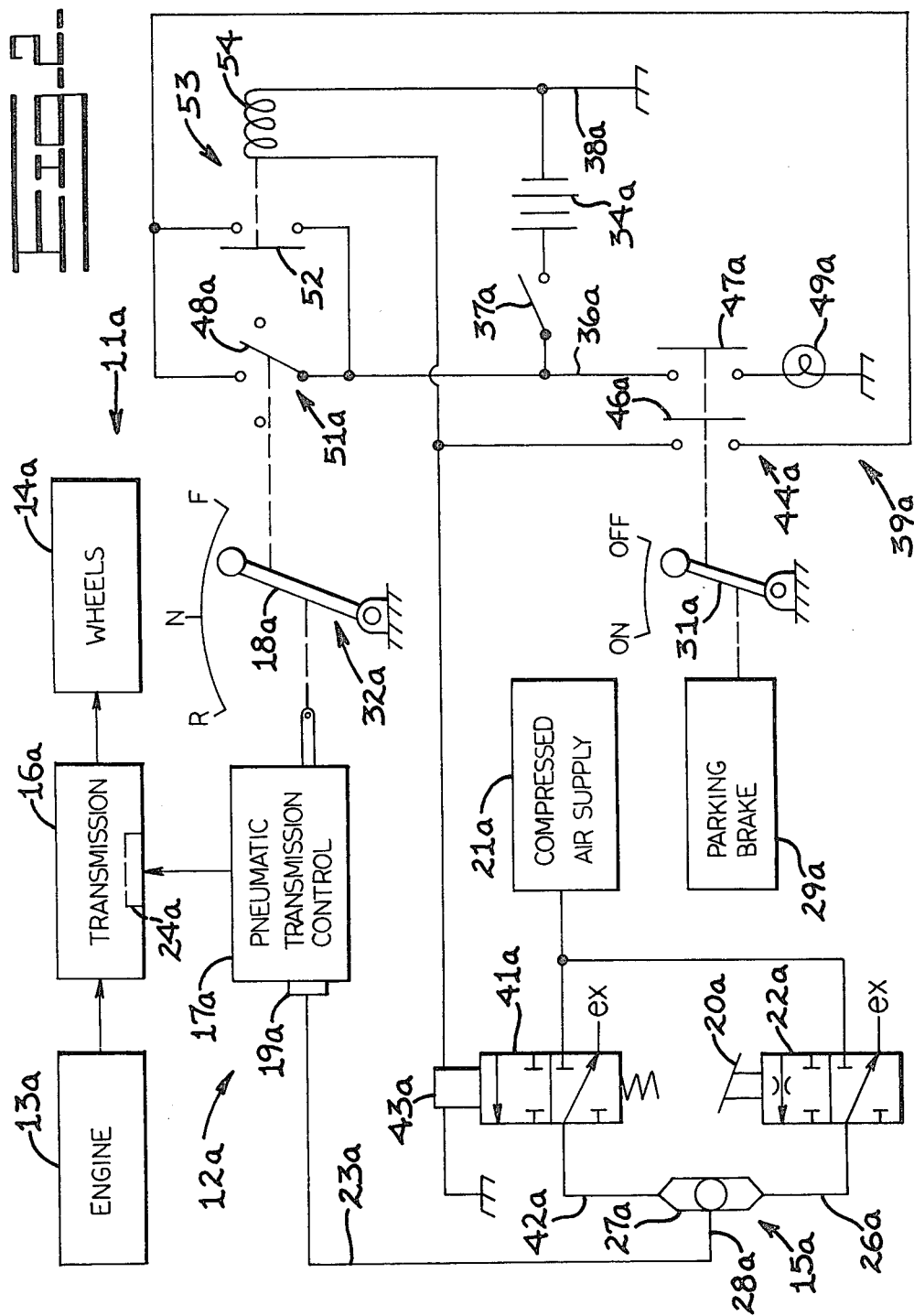

VEHICLE CONTROL SYSTEM WITH CONDITIONAL TRANSMISSION-BRAKE INTERLOCK

TECHNICAL FIELD

This invention relates to control systems for vehicles and more particularly to vehicle control systems which include a transmission-brake interlock for preventing initiation of powered travel of the vehicle while a parking brake remains engaged.

BACKGROUND ART

The brake system of a powered vehicle typically includes a service brake for use while the vehicle is in operation and a parking brake for immobilizing the vehicle when it is not in use. Unlike the service brake, the parking brake is not designed to resist the driving force of the vehicle engine and will wear extremely rapidly if it is applied when vehicle is undergoing powered travel. The most usual condition under which that is likely to occur is at start up. The operator may inadvertently forget to release the parking brake prior to shifting the transmission into drive and depressing the accelerator pedal or the like.

Many vehicles are provided with a transmission and brake interlock to avoid damage to the parking brake at start up. As heretofore constructed, the interlock typically neutralizes the transmission, regardless of the position of the operator's shift lever or the like, while the parking brake is engaged. This forces the operator to release the brake as a precondition to initiating powered travel of the vehicle.

While use of the parking brake during vehicle operation is ordinarily undesirable, special circumstances may make it necessary. Most notably, if the service brake should malfunction it may be necessary to rely on the parking brake to slow or stop the vehicle. Because of the limited capacity of the parking brake to substitute for the service brake it would also be desirable to make use of other motion retarding effects to supplement the action of the parking brake in making an emergency stop. Prior interlocks of the kind described above eliminate one source of motion retarding, the vehicle engine, which could otherwise be used for this purpose.

DISCLOSURE OF THE INVENTION

The present invention is directed to overcoming one or more of the problems as set forth above.

In one aspect of the present invention, a control system for a vehicle having a drive transmission which may be shifted between a neutral non-drive transmitting condition and at least one drive transmitting condition and having a brake which may be engaged and disengaged, and having a control element which is operated in conjunction with initiating travel of the vehicle, the control system including neutralizing means for maintaining the transmission in the neutral condition in response to a neutralizing signal and further including a transmission and brake interlock circuit means for holding the transmission in the neutral condition by transmitting the neutralizing signal to the neutralizing means if the control element is operated while the brake is engaged. The control system is further provided with interlock control circuit means for inactivating the interlock circuit means during travel of said vehicle by blocking transmission of the neutralizing signal from the interlock circuit means to the neutralizing means to enable engagement of said brake without neutralization of the transmission when the vehicle is traveling.

By disabling the basic transmission brake interlock after the vehicle has been started and is undergoing powered travel, the invention allows the parking brake to be applied for emergency slowing or stopping without at the same time establishing a neutral condition in the transmission. Consequently, the braking action of the parking brake at such times is supplemented by the retarding action which the vehicle engine exerts due to the engaged condition of the transmission. The emergency braking capability of the vehicle is thereby enhanced without any sizable structural complication of the vehicle.

BRIEF DESCRIPTION OF THE DRAWINGS

FIG. 1 is a combined electrical and hydraulic circuit diagram depicting a first embodiment of the present invention, and FIG. 2 is an electro-hydraulic circuit diagram of a second embodiment of the invention.

BEST MODES FOR CARRYING OUT THE INVENTION

Referring initially to FIG. 1 of the drawing, certain basic components of the drive system 11 of a vehicle 12 are depicted in block form as they may be of any of various known internal constructions. Such basic components include a vehicle engine 13 for supplying drive to ground engaging means such as wheels 14 through a drive transmission 16. Transmission 16 is of the known type which is shiftable to a neutral condition at which the drive path between the engine and wheels is interrupted and which is also shiftable to at least one drive condition at which drive is transmitted from engine 13 to the wheels 14. A transmission control 17 is coupled to the transmission 16 to shift the transmission between the different conditions in response to movement of a shift lever 18 or the like. While the transmission 16 may be of any of a variety of known forms, in the present example the transmission 16 is of the form shiftable from neutral to either of a forward drive and a reverse drive condition in response to pneumatic pressure signals from transmission control 17.

Pneumatic transmission controls 17 of this general type are often provided with neutralizing means 15 including a neutralizing signal inlet 19 which may be pressurized to force a neutral or non-drive transmitting condition in the transmission regardless of the setting of the shift lever 18 or the like. In some vehicles, such as industrial lift trucks, for example, the neutralizing signal inlet 19 is employed in conjunction with an operator's creeper or inching pedal 20 which is used to provide very precise control of vehicle motion at low speeds. The vehicle may carry a source of pressurized fluid 21 which is a compressed air supply driven by engine 13 in this example, and the creeper pedal 20 operates a creeper valve 22 connected between the compressed air supply and a neutralizing signal line 23 to the neutralizing signal inlet 19 of transmission control 17. The creeper valve 22 has a normal or unactuated position at which signal line 23 is vented and may be shifted by pedal 20 to pressurize line 23 to a selectable degree. This causes controlled slippage of the internal drive conditioning clutches 24 or the like of the transmission to decrease the torque supplied to the wheels 14 to a desired extent. For purposes which will be hereinafter described, creeper valve 22 is connected to line 23 through one inlet 26 of a shuttle valve 27, the outlet 28 of the shuttle valve being communicated with line 23.

Additional components of the vehicle 12 which may be of suitable known detailed constructions include a parking brake 29 shiftable between an engaged condition and a disengaged condition by a brake lever 31. The vehicle is further provided with another control member 32 which is operated in conjunction with initiating travel of the vehicle and which in this example is an accelerator pedal 33 that is selectively depressed to increase the speed of engine 13. The vehicle further includes a source of electrical current 34 which may be a battery having a positive side selectively connectable with a B+ conductor 36 through an ignition or start switch 37 and having a negative side forming a chassis ground connection 38 to the vehicle frame.

Considering now the transmission-brake interlock 39 for establishing a neutral condition in transmission 16, if the control member 32 should be operated to initiate powered travel of the vehicle while brake 29 is applied, a two-position neutralizing valve 41 is connected between compressed air supply 21 and neutralizing signal line 23 through the other inlet 42 of shuttle valve 27. Neutralizing valve 41, which is spring biased to an unactuated position at which inlet 42 is vented, is a solenoid controlled valve having a solenoid 43 which may be electrically energized to shift the valve to an alternate actuated position at which compressed air from supply 21 is transmitted to neutralizing signal line 23 through the shuttle valve 27.

An interlock switch means 44, which is a normally open double pole double throw micro-switch in this example is operated by the parking brake lever 31 so that both sets of switch contacts 46 and 47 are held open when the parking brake 29 is disengaged and so that both sets of switch contacts are closed when the parking brake is engaged. The first set of switch contacts 46, which constitute the interlock switch, are connected between B+ conductor 36 and chassis ground in series with an override switch 48 to be hereinafter described in more detail, and in series with the control solenoid 43 of neutralizing valve 41. Thus, if switch contacts 46 are closed because the parking brake 29 is engaged and ignition switch 37 is closed and if override switch 48 is also closed by depression of accelerator pedal 33, then solenoid 43 is energized to actuate valve 41 to neutralize transmission 16.

The second set of switch contacts 47 of interlock switch means 44 are connected between B+ conductor 36 and circuit ground in series with an indicator lamp 49 which serves to provide a visual indication to the vehicle operator when the parking brake 29 is engaged provided that ignition switch 37 is closed.

The interlock control means 51 for enabling application of the brake 29 without neutralizing transmission 16 during powered travel of the vehicle includes the override switch 48 which is normally open and which is operated by the accelerator pedal 33 to be closed by depression of the accelerator pedal. As previously described, override switch 48 is connected between B+ conductor 36 and chassis ground in series relationship with the interlock switch contacts 46 and neutralizing valve solenoid 43. Thus, an attempt to initiate travel of the vehicle by operation of accelerator pedal 33, following closure of ignition switch 37, results in neutralization of transmission 16 if parking brake 29 is engaged at the time.

Alternate forms of interlock control means may by utilized if desired. FIG. 2 depicts a modified vehicle control system 11a in which the control element 32a which operates the interlock control means 51a is the transmission shift lever 18a rather than the accelerator pedal as in the previous instance. Movement of the transmission shift lever 18a out of the neutral setting and depression of the accelerator pedal are both preconditions to initiating powered travel of the vehicle and thus either may be relied upon to signal an attempt at start up of the vehicle.

Components of the embodiment of FIG. 2 other than the interlock control means 51a are similar to those previously described. Thus, the engine 13a, transmission 16a and transmission control 17a ground engaging means 14a, compressed air supply 21a, solenoid valve 41a, creeper valve 22a and shuttle valve 27a will not be redescribed. Similarly, the parking brake 29a, brake control lever 31a, interlock switch means 44a with switch contacts 46a and 47a, together with battery 34a and ignition switch 37a, are similar to the corresponding elements of the previously described embodiment. If the vehicle has an engine which is startable while the shift lever is away from neutral, it is preferably equipped with one of the known devices which block subsequent transmission engagement until the lever is at least momentarily returned to the neutral position.

The interlock control means 51a in the embodiment of FIG. 2 includes an override switch 48a connected between B+ conductor 36a and circuit ground in series with interlock switch contacts 46a and neutralizing valve solenoid 43a and which is operated by movement of control member 32a which is the transmission shift lever 18a in this case. More specifically, override switch 48a is closed only when the shift lever 18a is at the neutral setting and is opened when the shift lever is shifted away from the neutral setting towards either the forward or reverse drive positions. Thus, when the shift lever 18a is at neutral, prior to initiation of travel of the vehicle, neutralizing valve 41a is actuated to pressurize the neutralizing signal line 23a if interlock switch contacts 46a are closed at that time, due to engagement of the parking brake 29a. Latching means 53 are provided to maintain the neutral condition of the transmission when shift lever 18a is moved out of the neutral setting to the forward or reverse drive position, thereby opening override switch 48a, if the parking brake 29a remains engaged at that time. Latching means 53 includes normally open relay contacts 52 connected in parallel with the override switch 48a that are operated by a driver coil 54 which closes the relay contacts upon being electrically energized. Driver coil 54 is connected between interlock switch contacts 46a and circuit ground in parallel with solenoid 43a of neutralizing valve 41. Thus, driver coil 54 holds relay contacts 52 closed to continue energization of the neutralizing valve solenoid 43a, although shift lever 18a may subsequently be moved out of neutral, until interlock switch contacts 46a are opened by release of the parking brake 29a.

INDUSTRIAL APPLICABILITY

In the operation of the embodiment of FIG. 1, the operator may control the vehicle 12 in the customary manner except insofar as the invention functions automatically to prevent powered movement of the vehicle if the parking brake 29 is engaged at the time that such movement is attempted. In order to initiate powered travel of the vehicle, the operator moves the transmission shift lever 18 from the neutral setting to either the forward drive or reverse setting and depresses accelerator pedal 33. Ignition switch 37 has been previously closed in conjunction with starting of the engine 13. Depression of the accelerator pedal 33 closes the override switch 48. If interlock switch contacts 46 are also closed at that time, because the parking brake is engaged, the accelerator pedal depression results in energization of solenoid 43 of neutralizing valve 41 and consequently in the transmission of compressed air to neutralizing signal inlet 19 of the pneumatic transmission control 17. Thus, the transmission 16 is neutralized and there is no powered movement of the vehicle until such time as the parking brake 29 is released. Release of the parking brake 29 opens interlock switch contacts 46 to de-energize solenoid valve 41 and depressurize neutralizing signal inlet 19 of the transmission control 17 allowing drive to be transmitted through the transmission. If parking brake 29 is already released at the time that accelerator pedal 33 is depressed to initiate powered travel of the vehicle, the open condition of interlock switch contacts 46 prevents energization of solenoid 43 of neutralizing valve 41 and the desired acceleration of vehicle may then proceed.

If it becomes necessary to use the parking brake 29 to stop the vehicle at a time when it is already undergoing powered travel, this is accomplished without neutralizing the transmission 16. In conjunction with engagement of the brake 29, the operator removes his foot from accelerator pedal 33. This opens override switch 48. Consequently, the shifting of the brake lever 31 to the engaged or on position accompanied by a closure of interlock switch contacts 46 does not energize the solenoid valve 41 and neutralize the transmission since the switch contacts 46 are connected to B+ conductor 36 through the now opened override switch 48. As the transmission 16 remains in an engaged or drive condition, the retarding action of engine 13 supplements the effect of the parking brake 29 in slowing or stopping motion of the vehicle.

A similar advantageous result is realized with the embodiment of FIG. 2. In the operation of the FIG. 2 embodiment, the solenoid valve 41a is energized to hold the transmission 16a in neutral since when the ignition switch 37a is closed to start engine 13a, the shift lever 18a is in the neutral position and parking brake 29a is engaged. Under these conditions, override switch 48a and interlock switch contacts 46a are both closed to transmit energizing current to the solenoid valve 41a. Latching relay driver coil 54 is also energized at this time through the closed override switch 48a and interlock switch contacts 46a. Consequently, the latching relay contacts 52 are also closed.

In order to initiate powered travel of the vehicle, the operator moves the shift lever 18a out of the neutral position towards either the forward drive or reverse drive settings and this opens override switch 48a. If the parking brake 29a has been disengaged prior to this time then the start up of the vehicle may proceed since interlock switch contacts 46a were opened, to de-energize solenoid valve 41a and latching relay driver coil 54, by the movement of brake lever 31a which disengaged the brake. If the parking brake 29a remains engaged at the time the shift lever 18a is shifted away from the neutral setting, then solenoid valve 41a remains energized and continues to hold the transmission 16a in neutral until such time as the parking brake 29a is released. While the movement of the shift lever 18a out of neutral opens the override switch 48a this does not in itself de-energize solenoid valve 41a since the relay contacts 52 which are connected in parallel with the override switch remain closed and continue to supply electrical current to both the solenoid and relay driver coil 54 through interlock switch contacts 46a. Powered travel of the vehicle is thus delayed until the operator disengages brake 29a and in the process opens interlock switch contacts 46a to de-energize the solenoid valve 41 and driver coil 54.

As in the case of the first embodiment, an application of the parking brake 29a after the vehicle is already undergoing powered travel does not cause neutralization of the transmission 16a and thus the retarding action of engine 13a is available to supplement the use of the parking brake under such emergency conditions. When the vehicle is undergoing powered travel, shift lever 18a is away from the neutral position and override switch 48a is open. Latching relay switch contacts 52 are also open since coil 54 has been de-energized due to the open condition of interlock switch contacts 46a. Consequently, a subsequent closure of interlock switch contacts 46a by application of the parking brake 29a during powered travel of the vehicle does not energize the solenoid valve 41a to neutralize the transmission 16a.

The invention was initially designed for use on industrial lift truck vehicles and has been described with reference to a coaction with the type of operator's controls typically found on such vehicles. The invention is also applicable to diverse other types of vehicle, and is readily adaptable to the differing forms of control members found in other types of vehicles. For example, the override switch 48a of the embodiment of FIG. 2 may be linked to and operated by an internal element of an automatic transmission instead of a manual shift lever 18a as in this particular example. Similarly, solenoid 43 may be arranged to operate mechanical mechanisms for neutralizing a transmission 16 or 16a in vehicles which do not employ a pneumatic form of transmission control. Other modifications and variations of the invention are readily possible.

Other aspects, objects and advantages of this invention can be obtained from a study of the drawings, the disclosure and the appended claims.

What is claimed is:

1. In a control system for a vehicle (12, 12a) having a drive transmission (16, 16a) which may be shifted between a neutral non-drive transmitting condition and at least one drive transmitting condition and having a brake (29, 29a) which may be engaged and disengaged, and having a control element (32, 32a) which is operated in conjunction with initiating travel of the vehicle, the control system including neutralizing means (19, 19a) for maintaining said transmission in said neutral condition in response to a neutralizing signal and further including a transmission and brake interlock circuit means (39, 39a) for holding said transmission in said neutral condition by transmitting said neutralizing signal to said neutralizing means if said control element is operated while said brake is engaged, the improvement comprising:

interlock control circuit means (51, 51a) for inactivating said interlock circuit means during travel of said vehicle by blocking transmission of said neutralizing signal from said interlock circuit means to said neutralizing means to enable engagement of said brake without neutralization of said transmission when said vehicle is traveling.

2. In a control system for a vehicle (12, 12a) having a drive transmission (16, 16a) which may be shifted to a neutral non-drive transmitting condition and having a brake (29, 29a) which may be engaged and disengaged, and having a control element (32, 32a) which is operated in conjunction with initiating travel of the vehicle, the control system including a transmission and brake interlock (39, 39a) for holding said transmission in said neutral condition if said control element is operated while said brake is engaged, and wherein said vehicle (12, 12a) has a source (34, 34a) of electrical current and has electrically actuated neutralizing means (15, 15a) for neutralizing said transmission and wherein said interlock (39, 39a) includes an interlock switch (46, 46a) connected between said source of current and said electrically actuated neutralizing means and which is coupled to said brake (29, 29a) to operate in conjunction therewith to transmit an electrical actuating signal to said neutralizing means when said brake is engaged and to block said electrical actuating signal from said neutralizing means when said brake is disengaged, the improvement comprising:

interlock control means (51, 51a) for inactivating said interlock during travel of said vehicle to enable engagement of said brake without neutralization of said transmission when said vehicle is traveling, wherein said interlock control means (51, 51a) includes override switch means (48, 48a) connected in series with said interlock switch (46, 46a) and which is responsive to movement of said control element (32, 32a) to transmit said electrical signal to said interlock switch when said control element is operated to initiate travel of said vehicle (12, 12a).

3. A vehicle control system as defined in claim 2 wherein said control element (32) is an accelerator pedal (33) and wherein said override switch means (51) includes an override switch (48) coupled to said pedal and which is closed by operation of said pedal to transmit said electrical signal to said interlock switch (46) and which is opened by release of said pedal to interrupt said transmission of said electrical signal to said interlock switch.

4. A vehicle control system as defined in claim 2 wherein said control element (32a) is the operator's transmission shift lever (18a) and has a neutral setting and at least one drive setting and wherein said override switch means comprises an override switch (48a) responsive to movement of said shift lever and which transmits said electrical signal to said interlock switch (46a) when said shift lever is at said neutral setting and which is opened when said shift lever is moved away from said neutral setting, and further comprises a latching means (53) having relay contacts (52) connected in parallel with said override switch and having driver means (54) energized through said interlock switch for closing said relay contacts to continue to supply said electrical signal to said interlock switch after said override switch is opened.

5. A vehicle control system as defined in claim 2 wherein said vehicle (12, 12a) has a fluid pressure operated transmission control (17, 17a) for shifting said transmission (16, 16a) and which has a neutralizing signal inlet (19, 19a) for receiving a fluid pressure neutralizing signal and wherein said vehicle further has a source (22, 22a) of pressurized fluid, wherein said electrically actuated neutralizing means (15, 15a) comprises a solenoid controlled neutralizing valve (41, 41a) connected between said source of pressurized fluid and said neutralizing signal inlet, said neutralizing valve having a control solenoid (43, 43a) connected to said interlock switch (46, 46a) to receive said electrical signal therefrom.

6. A vehicle control system as defined in claim 5 wherein said vehicle (12, 12a) has a manually operable creeper valve (22, 22a) also connected between said source (22, 22a) of pressurized fluid and said neutralizing signal inlet (19, 19a) and which may be actuated by an operator to selectively pressurize said neutralizing signal inlet, further comprising a shuttle valve (27, 27a) having an outlet (28, 28a) communicated with said neutralizing signal inlet and having a first (26, 26a) and a second (42, 42a) fluid inlet, said creeper valve being connected between said source of pressurized fluid and said first inlet of said shuttle valve and said neutralizer valve (41, 41a) being connected between said source of pressurized fluid and said second inlet of said shuttle valve.

7. A drive control system for a vehicle which has a transmission for coupling an engine to ground engaging means in at least one drive mode of operation and for decoupling said engine from said ground engaging means in a neutral condition and having neutralizing means for establishing said neutral condition in response to a neutralizing signal, said vehicle having a parking brake and having a control element which is actuated to begin powered travel of said vehicle from a stationary condition, said vehicle further having an interlock for transmitting said neutralizing signal to said transmission if said control element is actuated at a time when said brake is engaged, further comprising interlock control means for blocking transmitting of said neutralizing signal to said transmission through said interlock during powered travel of said vehicle.

8. A drive control system as defined in claim 7 wherein said control element is an accelerator pedal and said interlock control means comprises means for transmitting said neutralizing signal to said interlock in response to actuation of said accelerator pedal and for blocking transmission of said neutralizing signal to said interlock when said accelerator pedal is restored to an unactuated condition.

9. A drive control system as defined in claim 7 wherein said control element is a shift control for said transmission movable from a neutral setting to at least one drive setting, and wherein said interlock control means comprises means for transmitting said neutralizing signal to said interlock when said shift control is at said neutral setting thereof and for continuing to transmit said neutralizing signal to said interlock when said shift control is moved out of said neutral setting thereof until said brake is disengaged.

* * * * *